Sept. 30, 1952  W. G. WATKINS  2,612,239
WHEEL CHOCK FOR DUAL WHEEL VEHICLES
Filed Nov. 10, 1950
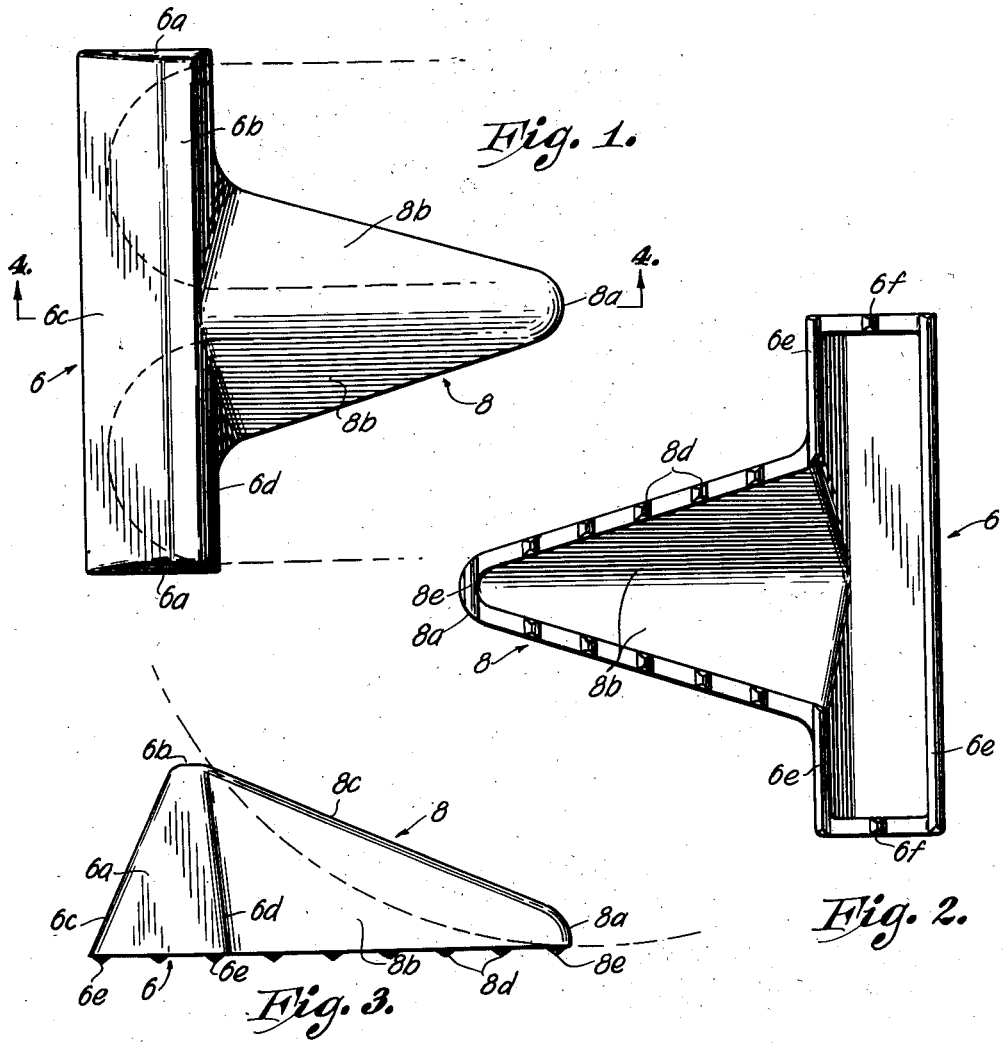
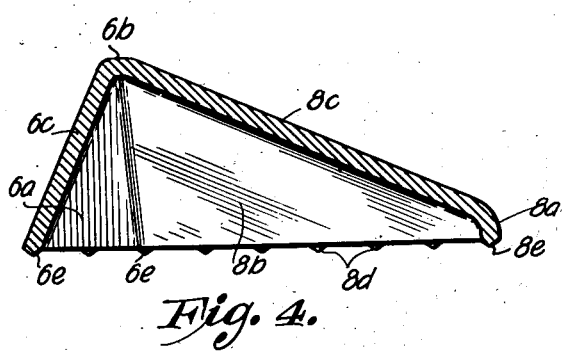
INVENTOR.
Walter G. Watkins
BY
ATTORNEY.

Patented Sept. 30, 1952

2,612,239

UNITED STATES PATENT OFFICE 2,612,239

WHEEL CHOCK FOR DUAL WHEEL VEHICLES

Walter G. Watkins, North Kansas City, Mo., assignor of one-half to Conn Withers, Liberty, Mo.

Application November 10, 1950, Serial No. 195,071

6 Claims. (Cl. 188—32)

This invention relates in general to wheel-blocking devices for vehicles and deals more particularly with a wheel chock for dual wheel vehicles.

It is well known that operators of motor vehicles oftentimes find it necessary to block the wheels of the vehicle in order to prevent accidental rolling of same while stopped on a grade or while unloading and loading heavy materials. As a matter of fact, the laws of some states, as well as the regulations of many insurance companies, require operators of large trucks or other heavy vehicles to carry with them at all times means for accomplishing this purpose.

The most common devices in use today are blocks of wood of rectangular or triangular cross-section, which are placed abutting the wheels transverse to the path of travel. However, this practice has proved to have many faults, particularly as used in relation to dual wheel vehicles, because of the exactness required in positioning the blocks to bear equally against both wheels. It has been noted that wooden blocks are often prone to slip due to their flat ground-engaging surface and thus twist out of blocking position should one of the wheels bear on the block with greater force than the other.

The main object of my invention, therefore, is to provide a wheel chock for dual wheel vehicles which is self-locking in the wheel-abutting direction and which is provided with a broad ground-engaging area lugged to prevent slippage.

Another object is to provide a wheel-blocking device which adheres more tightly to the ground as the pressure of the vehicle against the device increases.

A further object of my invention is to provide a wheel chock for dual wheel vehicles which is rugged enough to withstand abnormally heavy loads, yet light enough that it can be easily manipulated by the operator.

Still another object is to provide a device of the character indicated, which is simple and economical to manufacture.

Other and further objects of the invention will appear from the following description.

In the accompanying drawings which form a part of the instant specification and are to be read in conjunction therewith, and in which like reference numerals are used to indicate like parts in the various views:

Fig. 1 is a top plan view of a wheel chock constructed according to my invention, Fig. 2 is a bottom plan view of the chock, Fig. 3 is a side elevation of the chock, and Fig. 4 is a sectional view along the line 4—4 of Fig. 1, in the direction of the arrows.

Referring more in detail to the drawing, the broken lines in Figs. 1 and 2 indicate the outlines of a pair of pneumatic tires mounted side by side on a dual wheel, in operating relationship with my chock which comprises an elongate wedge-shaped, ground-engaging stop 6 transversely abutting the wheels along its top and a tapering inverted V-shaped nose 8 normal to the stop 6 extending inwardly along the ground and between the tires. The stop 6 and nose 8 are integral parts of a unitary T-shaped casting, preferably made from a light metal alloy, the casting being hollowed out on its under side so that the nose and stop are provided with contiguous marginal ground-engaging surfaces.

The conformation of the stop 6 is similar to an inverted trough, triangular in lateral cross-section, which has substantially parallel ends 6a. The faces of the stop intersect along the rounded top 6b, the outer face 6c lying in a diagonal plane forming an acute angle with the ground plane and the inner face 6d in a plane substantially normal to the ground plane.

Extending laterally from the inner face 6d and symmetrically intersecting same is the tapered nose 8, which is of uniformly diminishing height and width throughout its length, its largest end adjacent the stop 6 and of equal height therewith, and its rounded tip 8a interspaced between the wheel threads at their point of ground contact. The flat sides 8b intersect along the top 8c of the nose and diverge symmetrically downwardly therefrom to an intersection with the ground plane, thereby providing a wedge intermediate the tires, which increases in thickness in the direction of the stop along any plane parallel to the ground plane.

Referring particularly to Fig. 2, it will be noted that the marginal bottom surface of the chock is provided with a series of wedge-shaped lugs or projections which imbed in the ground to prevent slippage, those (6e) projecting from the bottoms of the stop faces 6c and 6d being continuous throughout the length of the stop, and those (8d) projecting from the bottom of the sides 8b of the nose 8 being spaced at intervals thereon. The ends 6a of the stop 6 each have one projection 6f centrally disposed thereon and the rounded tip 8a of the nose is provided with a projection 8e throughout its width.

The operation and mode of use of my chock will be fairly obvious from the foregoing description. The stop 6 is placed on the ground transversely abutting the wheels and the nose 8 is inserted between the wheels until the sides 8b strike the adjacent tire casings. The vehicle is then allowed to roll toward the stop 6 until the treads strike the top 6b thereof, the nose 8 being wedged more tightly between the tires and forced downwardly so that projections 8d and 8c are firmly seated against, or imbedded in, the ground. The firmly gripped nose holds the stop 6 upright against the rearward thrust of the wheels, and prevents twisting of the chock out of line due to shifting in the ground plane, thus effectively locking the stop in its operating position.

From the foregoing it will be seen that this invention is one well adapted to attain all of the ends and advantages which are obvious and which are inherent in the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In a wheel chock for rubber-tired, dual wheel vehicles, a T-shaped body adapted to rest on the ground and comprising a three-sided pyramidal stem insertable between the tires of a dual wheel, with an integral triangular prismatic cross bar projecting laterally from the rear end of the stem across the path of both tires.

2. In a wheel chock for rubber-tired, dual wheel vehicles, an elongate block adapted to be positioned on the ground parallel to the axis of a dual wheel, said block being of a length sufficient to span the space between the tires on said wheel and extend across the path of both, and a central stem rigid with said block projecting forwardly thereof along the ground and between the tires of said wheel, said stem having upwardly converging side walls adapted to bear against the sides of the respective tires to resist rotation of the block about its longitudinal axis under the influence of thrust imposed thereon by said tires.

3. A wheel chock as in claim 2 wherein the forward face of said block is substantially normal to the ground engaging base of the block and terminates in a horizontal upper edge against which the periphery of said tires bear.

4. In a wheel chock for rubber-tired, dual wheel vehicles, an elongate block adapted to be positioned on the ground parallel to the axis of a dual wheel, said block being of a length sufficient to span the space between the tires on said wheel and extend across the path of both, and a central stem rigid with said block projecting forwardly thereof along the ground and between the tires of said wheel, said stem having upwardly and forwardly converging side walls adapted to wedge between the sides of the respective tires to resist rotation of the block about its longitudinal axis under the influence of thrust imposed thereon by said tires.

5. In a wheel chock for rubber-tired, dual wheel vehicles, a T-shaped body adapted to rest on the ground and comprising a stem insertable between the tires of a dual wheel, said stem having a broad ground-engaging base and longitudinal side walls that converge upwardly from said base, and an integral crossbar projecting laterally from the end of the stem across the path of both tires.

6. In a wheel chock for rubber-tired, dual wheel vehicles, a T-shaped body adapted to rest on the ground and comprising a stem insertable between the tires of a dual wheel, said stem having a ground engaging base tapering from a wide rear end to a narrow forward end and longitudinal side walls that converge upwardly from said base to a central ridge sloping downwardly from the rear to the point of the stem, and an integral crossbar projecting laterally from the end of the stem across the path of both tires.

WALTER G. WATKINS.

REFERENCES CITED

The following references are of record in the file of this patent:

UNITED STATES PATENTS

| Number | Name | Date |
| --- | --- | --- |
| 1,222,374 | Evans | Apr. 10, 1917 |
| 2,182,044 | Ackerman | Dec. 5, 1939 |